US007856333B2

(12) United States Patent
Scholz

(10) Patent No.: US 7,856,333 B2

(45) Date of Patent: Dec. 21, 2010

(54) METHOD FOR COMMISSIONING ACTUATORS

(75) Inventor: Wolfgang Scholz, Minden (DE)

(73) Assignee: ABB AG, Mannheim (DE)

( * ) Notice: Subject to any disclaimer, the term of this patent is extended or adjusted under 35 U.S.C. 154(b) by 74 days.

(21) Appl. No.: 12/327,833

(22) Filed: Dec. 4, 2008

(65) Prior Publication Data

US 2009/0150107 A1 Jun. 11, 2009

(30) Foreign Application Priority Data

Dec. 6, 2007 (DE) ........................ 10 2007 058 777

(51) Int. Cl.
*G01P 21/00* (2006.01)
*G21C 17/00* (2006.01)

(52) U.S. Cl. ........................ 702/94; 702/182; 279/4.01; 279/4.02; 251/3; 251/14; 251/20; 251/21; 251/23; 251/57; 251/58; 251/60; 137/118.02; 137/174; 137/281; 73/1.57; 73/12.08; 73/37; 73/37.6

(58) Field of Classification Search ................... 702/94, 702/182; 279/1.01, 4.02; 251/3, 14, 20, 251/21, 23, 57, 58, 60; 137/118.02, 174, 137/281; 73/1.57, 12.08, 37, 37.6
See application file for complete search history.

(56) References Cited

PUBLICATIONS

Daw et al. "Parameter Identification for Nonlinear Pneumatic Cylinder Actuators," Nonliner and Adaptive Contrl, LNCIS 281, pp. 77-88, 2003.*

* cited by examiner

*Primary Examiner*—Sujoy K Kundu
(74) *Attorney, Agent, or Firm*—Buchanan Ingersoll & Rooney PC

(57) ABSTRACT

The disclosure relates to a method for commissioning pneumatically operated actuators that are controlled by a positioner. To determine the drive type, a constant flow of pneumatic fluid is applied to the actuator during commissioning while a drive-specific characteristic curve of the fed back position is recorded over time. Then the measured characteristic curve is compared with a given specimen characteristic curve. The drive type is inferred from the level of difference or agreement between the drive-specific characteristic curve and the specimen characteristic curve.

7 Claims, 1 Drawing Sheet

METHOD FOR COMMISSIONING ACTUATORS

RELATED APPLICATION

This application claims priority under 35 U.S.C. §119 to German Patent Application No. DE 10 2007 058 777.7 filed in Germany on Dec. 6, 2007, the entire content of which is hereby incorporated by reference in its entirety.

TECHNICAL FIELD

A method is disclosed for commissioning pneumatically operated actuators that are controlled by a positioner.

BACKGROUND INFORMATION

Linear drives and rotary drives are used in automation engineering and differ from each other in the way the final control element is actuated. These different types of drive require different forms of control by the positioner. To achieve this, a parameter is entered manually during commissioning of the pneumatically operated actuator that specifies whether a linear drive or a rotary drive is connected to the positioner. This procedure is prone to errors, and if an incorrect entry is made can result in damage to the actuator and/or the final control element.

SUMMARY

Exemplary embodiments disclosed herein can improve the commissioning of the known pneumatically operated actuator by detecting the drive type automatically.

A method is disclosed for commissioning pneumatically operated actuators that are controlled by a positioner, wherein a constant flow of pneumatic fluid is applied to the actuator during commissioning, while the pneumatic fluid is applied, a drive-specific characteristic curve of the fed back position is recorded over time, the measured characteristic curve is compared with a given specimen characteristic curve, and the drive type of the actuator is inferred from the level of difference or agreement between the drive-specific characteristic curve and the specimen characteristic curve.

In another aspect, an arrangement is disclosed for commissioning an actuator. Such an arrangement comprises: a positioner capable of determining a drive type based on a constant flow of pneumatic fluid applied to the actuator; a lifting rod mechanically caused to be moved by the constant flow of pneumatic fluid to the actuator; and a position sensor that senses the movement of the lifting rod for feedback signaling to the positioner. The positioner records data for a drive-specific characteristic curve based on the feedback signal for comparison of the measured characteristic curve with a given specimen characteristic curve to infer the drive type.

BRIEF DESCRIPTION OF THE DRAWINGS

Further details and advantages of the disclosure are described in greater detail below using an exemplary embodiment. In the drawings required for this purpose.

DETAILED DESCRIPTION

Figure 1:
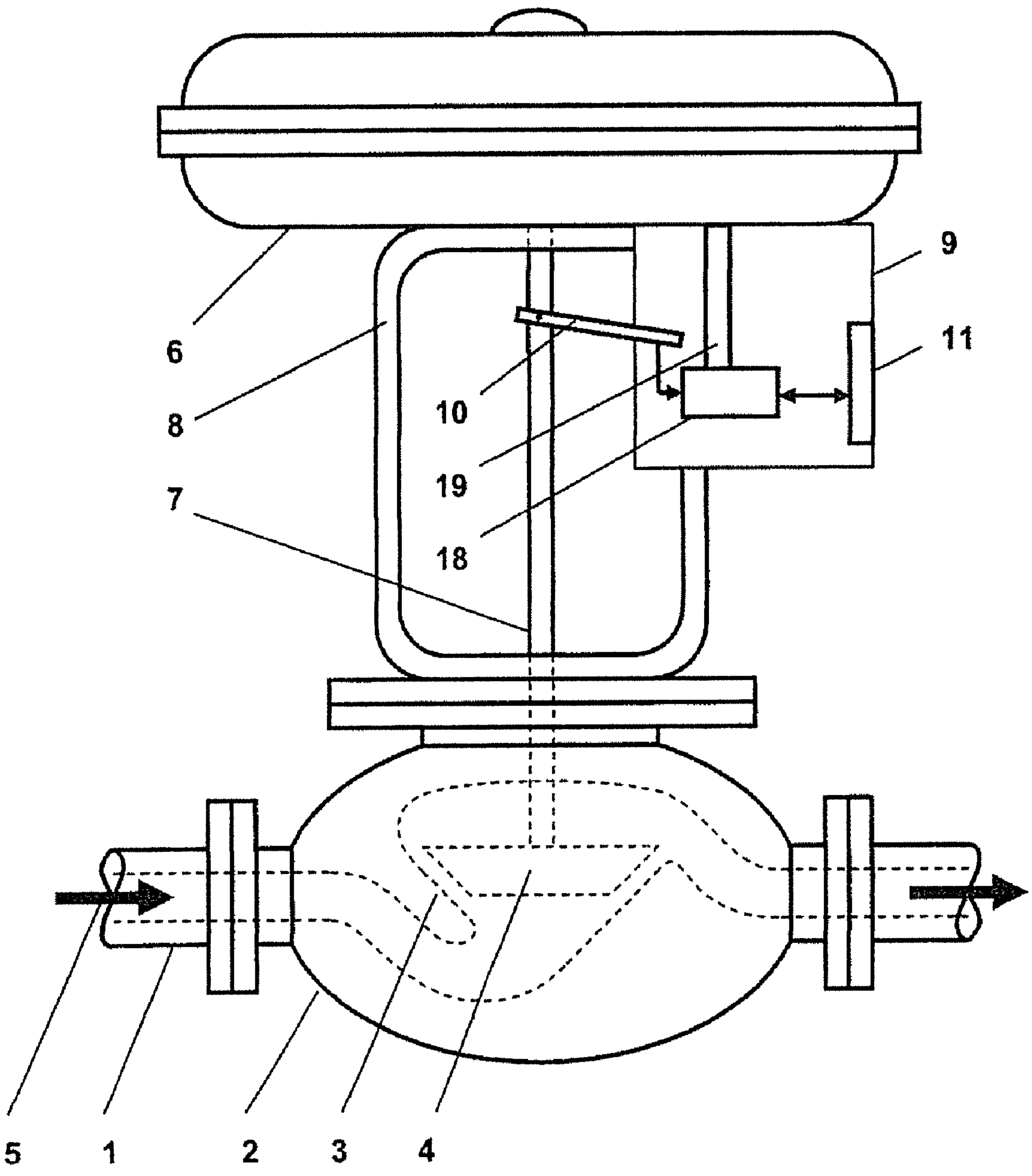
FIG. 1 shows an exemplary pneumatically operated actuator mounted on a process valve.

The disclosure is based on a pneumatically operated actuator, which is connected to a positioner and controlled by this positioner, with the position of the drive of the actuator being fed back to the positioner.

According to an exemplary embodiment of the disclosure, to determine the drive type, a constant flow of pneumatic fluid is applied to the actuator during commissioning while a drive-specific characteristic curve of the fed back position is recorded over time. Then the measured characteristic curve is compared with a given specimen characteristic curve. The drive type is inferred from the level of difference or agreement between the drive-specific characteristic curve and the specimen characteristic curve.

The shape of the characteristic curve of a rotary drive differs significantly from the shape of the characteristic curve of a linear drive. The differences are easily exposed by comparing with a given specimen characteristic curve.

According to another exemplary embodiment of the disclosure, it is provided that the given specimen characteristic curve is determined by idealizing known characteristic curves of one of the two drive types to be distinguished. Where the observed drive type matches the drive type on which the specimen characteristic curve is based, the level of agreement between the characteristic curves is significantly high. Where the observed drive type differs from the drive type on which the specimen characteristic curve is based, its characteristic curve differs significantly from the specimen characteristic curve.

According to yet another exemplary embodiment of the disclosure, it is provided that the level of agreement between the characteristic curve of the observed actuator and the specimen characteristic curve is determined by cross-correlation.

As shown in FIG. 1, a process valve 2 is fitted in a pipeline 1, a section of which is shown, of a process engineering plant, which is not shown further. Inside the process valve 2 is a closing body 4 that interacts with a valve seating 3 to control the amount of process medium 5 that passes through. The closing body 4 is operated linearly by an actuator 6 via a lifting rod 7. The actuator 6 is connected to the process valve 2 via a yoke 8. A positioner 9 is mounted on the yoke 8. The travel of the lifting rod 7 is signaled to the positioner 9 via a position sensor 10. The detected travel is compared in a control unit 18 with the setpoint value supplied via a communications interface 11, and the actuator 6 is controlled as a function of the determined control error. The control unit 18 of the positioner 9 comprises an I/P converter for converting an electrical control error into an appropriate control pressure. The I/P converter of the control unit 18 is connected to the actuator 6 via a pneumatic fluid supply line 19.

During commissioning, a constant flow of pneumatic fluid is applied to the actuator 6 by the positioner 9 in order to determine the drive type. This causes the lifting rod 7 to move, and this movement is signalled to the positioner 9 by the position sensor 10. In the positioner 9, a drive-specific characteristic curve of the fed back position of the lifting rod 7 is recorded over time.

The recorded characteristic curve is compared with a given specimen characteristic curve. The drive type is inferred from the level of difference or agreement between the drive-specific characteristic curve and the specimen characteristic curve.

$$y_l = x_l(l) \text{ for } l = 0 \ldots (n-1)$$

The y-values are compared with an ideal function for a linear drive. The cross-correlation is defined by the coefficients $$C_l = \sum_{k=0}^{n-1} y_k Z_{k+l}$$

In addition, assembly errors are detected by comparing the characteristic curve of the observed actuator with the specimen characteristic curve using cross-correlation, these errors being revealed by a shift in the characteristic curve by a fixed amount (offset) compared with the specimen characteristic curve. These errors are advantageously detected using the same means as those provided for detecting the drive type. The result of the absolute position measurement is thereby improved.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCES

1 pipeline
2 process valve
3 valve seating
4 closing body
5 process medium
6 actuator
7 valve rod
8 yoke
9 positioner
10 position sensor
11 communications interface
18 control unit
19 pneumatic fluid supply line

What is claimed is:

1. A method for commissioning pneumatically operated actuators that are controlled by a positioner, comprising:

a constant flow of pneumatic fluid is applied to the actuator during commissioning, while the pneumatic fluid is applied, a drive-specific characteristic curve of the fed back position is recorded over time, the measured characteristic curve is compared with a given specimen characteristic curve, and the drive type of the actuator is inferred from the level of difference or agreement between the drive-specific characteristic curve and the specimen characteristic curve.

2. The method as claimed in claim 1, wherein the given specimen characteristic curve is determined by idealizing known characteristic curves of one of the two drive types to be distinguished.

3. The method as claimed in claim 1, wherein the level of agreement between the characteristic curve of the observed actuator and the specimen characteristic curve is determined by cross-correlation.

4. The method as claimed in claim 2, wherein the level of agreement between the characteristic curve of the observed actuator and the specimen characteristic curve is determined by cross-correlation.

5. An arrangement for commissioning an actuator, comprising:

a positioner capable of determining a drive type based on a constant flow of pneumatic fluid applied to the actuator;

a lifting rod mechanically caused to be moved by the constant flow of pneumatic fluid to the actuator; and a position sensor that senses the movement of the lifting rod for feedback signaling to the positioner, wherein the positioner records data for a drive-specific characteristic curve based on the feedback signal for comparison of the measured characteristic curve with a given specimen characteristic curve to infer the drive type.

6. The arrangement according to claim 5, wherein the drive type is inferred based on a level of difference or agreement between the drive-specific characteristic curve and the specimen characteristic curve.

7. The arrangement according to claim 5, wherein the actuator is a pneumatically operated actuator.

* * * * *